UNITED STATES PATENT OFFICE.

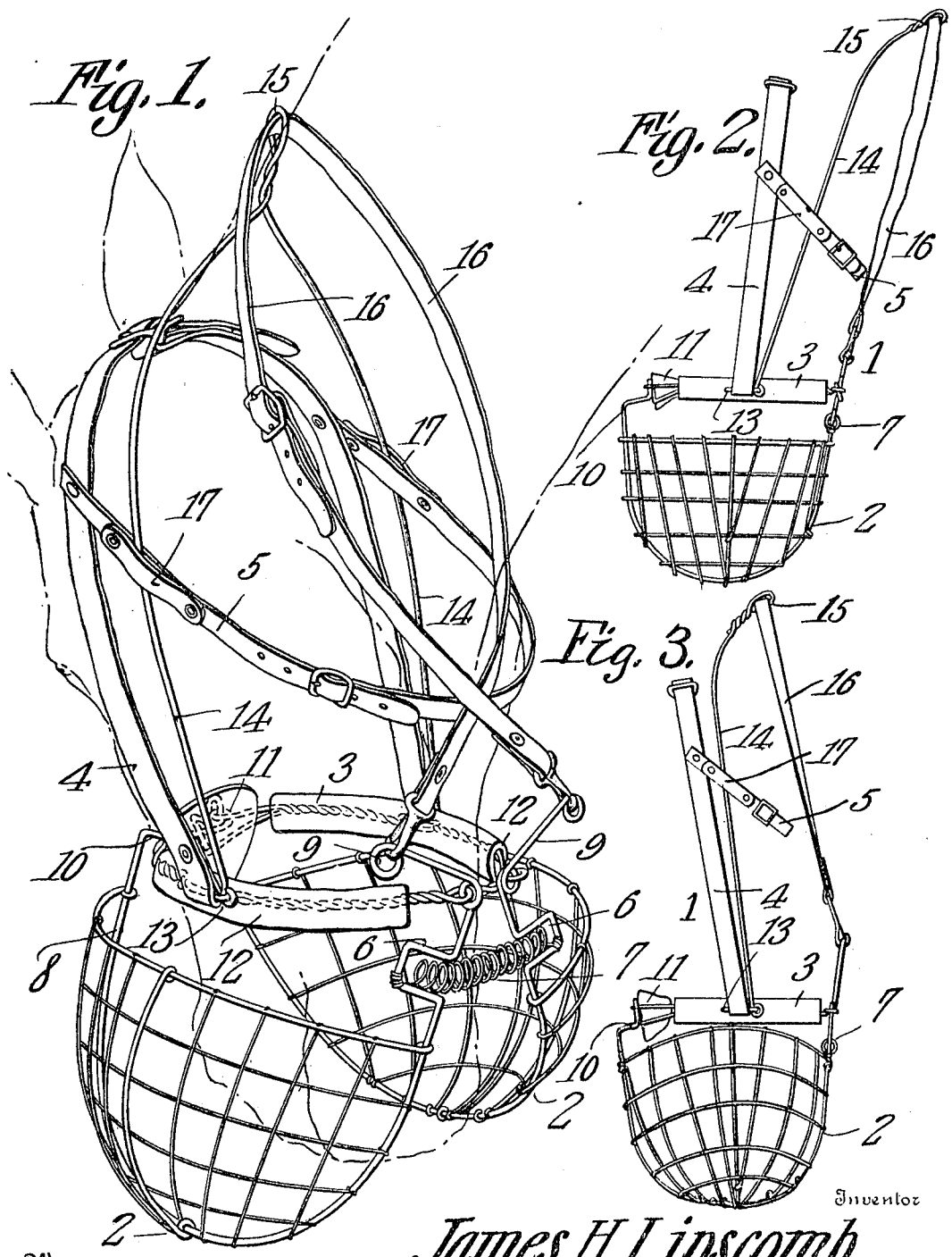

JAMES H. LIPSCOMB, OF PILOT POINT, TEXAS.

MUZZLE.

950,335.  Specification of Letters Patent.  Patented Feb. 22, 1910.

Application filed July 17, 1909. Serial No. 508,167.

*To all whom it may concern:*

Be it known that I, JAMES H. LIPSCOMB, a citizen of the United States, residing at Pilot Point, in the county of Denton and State of Texas, have invented a new and useful Muzzle, of which the following is a specification.

This invention relates to improvements in muzzles, and more particularly to improvements on Patent No. 533,476, issued to me, February 5, 1895.

The object of the present invention is to provide a method of constructing the muzzle appearing in my previous patent, in a manner that will cheapen the cost of manufacture, and promote the comfort of the animal wearing the same.

In the aforesaid patent, it is necessary to tighten the throat latch to a degree which would endanger the breathing of the horse, to prevent the head stall from being removed by the pressure of the operating rods thereon. This disadvantage is avoided in the present invention, and a muzzle is provided, constructed throughout of woven wire, that rests entirely on the animal's head.

Figure 1 is a perspective view of my improvement in the position taken when the animal is grazing; Fig. 2 is a diagrammatic view of the same when the animal has his head in raised position; Fig. 3 is a similar view showing the relative position of the operative rods when the animal is grazing.

Reference being had to the drawings, 1 designates a muzzle composed of similar opposite sections 2 formed of wire and hinged to the nose band 3 of a similar material, which is adapted to encircle the nose of an animal and to form the nose band of a bridle or halter composed of a head stall 4 and a throat latch 5. The sections are concavo-convex, and have formed in their rearward edges, corresponding angular recesses 6, there being interposed between said recesses a coil spring 7 adapted to draw the said sections 2 together. These recesses are formed in the binding wires 8 which extend entirely around the nose of the animal and form at their rearward extremities the diverging operating arms 9 adapted to be secured to the nose band 3, and, at their forward extremities, the centrally disposed hinge 10. To provide against rubbing and injuring the nose of the animal, a protecting pad 11 is arranged at the inner side of the hinge 10 and the nose band 3 is provided with a leather covering 12.

A keeper 13 is formed integrally with the nose band 3 on each side thereof and provides a means whereby the head stall 4 and the operating rods 14 are secured to the same. The rods 14 extend upwardly in a plane approximately parallel to that occupied by the head stall 4 and form at their junction a loop 15 through the instrumentality of which the muzzle is operated by the operating strap 16 which passes through the said loop, crosses under the horse's neck, and is secured to the diverging actuating arms 9. In order that these straps and guards may be held in their normal position there is carried on the throat latch 5 loops 17 through which the rods 14 pass and are slidably held in such a manner that when the horse's head is swung down, the same will be projected forward applying a pull to the operating strap 16 thus operating the converging arms 9, and opening the sections 2 of the muzzle.

It will be noted that in the present invention, the operating rods 14 are located directly behind the ears of the animal and are so situated that the neck of the same is in no way impaired or hampered by the same, and, that there is no necessity of maintaining the throat latch 5 taut to an excessive degree in order that the head stall may not be displaced by the pressure of the said operating rods thereon.

Having thus fully described my invention, and disclosed the advantages over my previous patent, what I claim as new and desire to secure by U. S. Letters Patent is:—

1. In a muzzle of the class described, the combination of a nose-band, laterally swinging muzzle sections hung thereon, a spring disposed in said muzzle sections for drawing the same together, a head-stall secured to said nose-band, an operating rod in a plane parallel to said head-stall located adjacent the animal's ears, and means extending from the upper extremity of said operating rod to the hinged muzzle sections for diverging the same upon the lowering of the animal's head.

2. In a muzzle of the class described, the combination with a nose-band, of laterally swinging muzzle sections hung thereon, a head-stall secured to said nose-band, an operating rod secured to the nose-band in a plane parallel to said head-stall, a throat-latch attached to said head-stall for slidably securing said operating rod, a connection between the upper end of said rod and the muzzle sections to separate the sections and means whereby the said muzzle sections are retained in a normally closed position.

3. In a muzzle of the class described, the combination with a nose-band, of laterally swinging muzzle sections hung thereon and having diverging operating arms adjacent the rearward hinge thereof, a head-stall secured to said nose-band, a throat-latch attached to the head stall and provided with loops, an operating rod likewise secured to said nose-band and extended in a plane parallel to that occupied by the head-stall and slidably secured in the loops on said throat-latch, and means extending from the upper extremity of said operating rod to the diverging arms on the muzzle section for opening the same upon the lowering of the animal's head.

4. In a muzzle of the class described, the combination with a nose-band, of laterally swinging muzzle sections hung thereon having diverging operating arms adjacent the rearward hinge thereof, a head-stall secured to said nose-band, a throat-latch attached to the head-stall and provided with loops, an operating rod likewise secured to said nose-band and extended in a plane parallel to that occupied by the head-stall and slidably secured in the loops on said throat-latch, and a strap extending from the upper extremity of said operating rod to the diverging arms of said muzzle sections for opening the latter when the animal's head is lowered.

5. In a muzzle of the class described, the combination with a nose-band, of laterally swinging woven wire muzzle sections having angular recesses formed in the rearward face thereof, a coil spring carried in said angular recesses, a keeper provided on each side of said nose-band, a head-stall, and an operating rod secured to said keeper, said operating rod and head-stall being held in spaced approximately parallel relation by the throat-latch, and means comprising a strap extending from the upper extremity of said operating rod to the muzzle sections for diverging the same upon the lowering of the animal's head.

In testimony that I claim the foregoing as my own, I have hereto affixed my signature in the presence of two witnesses.

JAMES H. LIPSCOMB.

Witnesses:
  Isac A. Lemond,
  Stephen W. Mirick.